US009366412B2

(12) United States Patent
Kim

(10) Patent No.: US 9,366,412 B2
(45) Date of Patent: Jun. 14, 2016

(54) COLOR LIGHT GUIDE APPLYING LAMP FOR VEHICLE

(71) Applicant: SL Corporation, Daegu (KR)

(72) Inventor: Min Suk Kim, Daegu (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 13/706,669

(22) Filed: Dec. 6, 2012

(65) Prior Publication Data

US 2013/0148371 A1 Jun. 13, 2013

(30) Foreign Application Priority Data

Dec. 13, 2011 (KR) ........................ 10-2011-0133803

(51) Int. Cl.

| | |
|---|---|
| ***F21V 9/00*** | (2015.01) |
| ***F21V 9/08*** | (2006.01) |
| ***B60Q 3/00*** | (2006.01) |
| ***F21S 8/10*** | (2006.01) |
| ***F21K 99/00*** | (2016.01) |

(52) U.S. Cl.

CPC . *F21V 9/08* (2013.01); *B60Q 3/004* (2013.01); *F21K 9/50* (2013.01); *F21K 9/56* (2013.01); *F21S 48/1131* (2013.01); *F21S 48/12* (2013.01); *F21S 48/1241* (2013.01); *F21S 48/215* (2013.01); *F21S 48/2218* (2013.01); *F21S 48/2225* (2013.01)

(58) Field of Classification Search

CPC ..... B60Q 1/34; B60Q 1/0011; F21S 48/1241; F21S 48/12; F21S 48/1208; F21S 48/1216; F21S 48/1131; F21K 9/56; F21K 9/50; F21K 9/08

USPC .................................. 362/510, 511, 522, 498

See application file for complete search history.

(56) References Cited

U.S. PATENT DOCUMENTS

| | | | | |
|---|---|---|---|---|
| 6,280,480 | B1 * | 8/2001 | Tuttle | B60Q 1/2607 362/241 |
| 6,577,073 | B2 * | 6/2003 | Shimizu et al. | 315/246 |
| 6,742,907 | B2 * | 6/2004 | Funamoto et al. | 362/625 |
| 7,001,058 | B2 * | 2/2006 | Inditsky | 362/610 |
| 2003/0133307 | A1 * | 7/2003 | Sugihara et al. | 362/490 |
| 2003/0156425 | A1 * | 8/2003 | Turnbull et al. | 362/545 |
| 2003/0169585 | A1 * | 9/2003 | Okuwaki | 362/31 |
| 2003/0202349 | A1 * | 10/2003 | Suehiro et al. | 362/245 |
| 2003/0206408 | A1 * | 11/2003 | Funamoto et al. | 362/31 |
| 2003/0223218 | A1 * | 12/2003 | Kawakami | 362/31 |

(Continued)

FOREIGN PATENT DOCUMENTS

| | | | |
|---|---|---|---|
| JP | 2005-183139 | A | 7/2005 |
| JP | 2006-202533 | A | 8/2006 |
| JP | 4622978 | B2 | 2/2011 |

*Primary Examiner* — Robert May
*Assistant Examiner* — Bryon T Gyllstrom
(74) *Attorney, Agent, or Firm* — Mintz Levin Cohn Ferris Glovsky and Popeo, P.C.; Kongsik Kim; Colleen H. Witherell

(57) ABSTRACT

Disclosed is a vehicle lamp which irradiates a desired color by mixing colors of light by using a colored light source or a light guide including a color layer or the like. A color light guide applying lamp for vehicle includes a light source which irradiates light of a first color, a light guide, at least one portion of which exhibits a second color, wherein after passing through the light guide, the light of the first color exhibits a third color by mixing the first color and the second color.

21 Claims, 11 Drawing Sheets

(56) References Cited

U.S. PATENT DOCUMENTS

2004/0100788 A1* 5/2004 Ju .................................. 362/31
2004/0105265 A1* 6/2004 Takizawa ...................... 362/293
2004/0165371 A1* 8/2004 Kitamura et al. ............... 362/31
2004/0196667 A1* 10/2004 Lea .............................. 362/583
2005/0063181 A1* 3/2005 Chiba et al. ................... 362/226
2009/0034292 A1* 2/2009 Pokrovskiy et al. .......... 362/617

* cited by examiner

COLOR LIGHT GUIDE APPLYING LAMP FOR VEHICLE

CROSS-REFERENCE TO RELATED APPLICATION

This application claims priority from Korean Patent Application No. 10-2011-0133803 filed on Dec. 13, 2011 in the Korean Intellectual Property Office, and all the benefits accruing therefrom under 35 U.S.C. 119, the contents of which in its entirety are herein incorporated by reference.

BACKGROUND

1. Technical Field

The present inventive concept relates to a vehicle lamp including a light guide unit, and more particularly to a vehicle lamp which irradiates a desired color by mixing colors of light by using a colored light source or a light guide including a color layer or the like.

2. Description of the Related Art

Typically, a vehicle includes headlights that are configured to radiate light in front of the vehicle to provide visibility in front of the vehicle during nighttime driving and turn signal lamps configured to indicate whether the vehicle is turning left or right, which are mounted on the front surface of the vehicle, and rear combination lamps which include combined brake lamps, tail lights and turn signal lamps that are mounted at the rear end of the vehicle.

For example, FIG. 1 is a diagram showing the existing vehicle head lamp. FIG. 2 is a schematic diagram illustrating a structure in which light is irradiated from a portion A including the light guide of the head lamp of FIG. 1.

The existing light guide typically uses a white LED 10, and light from the white LED 10 is transmitted to a body of a light guide 20, thereby finally emitting white light out in front of the vehicle. This is because white light is required to satisfy the light distribution regulations of the vehicle, and thus a white LED is generally used for this.

However, in both domestic and foreign vehicle designs have tried to apply a distinctive colored light guide in order to enhance the vehicle brands unique image. However, since the light guide is typically responsible for positioning the headlamp, applying a turn signal, daytime running lights (DRL), or providing backup lights, it is also required to satisfy the light distribution regulations of the vehicle for brightness, chromaticity and the like.

SUMMARY

The present invention provides a color light guide applying lamp for vehicle which has a distinctive design when a light source is in an OFF state (i.e., "OFF"), and satisfies the light distribution regulations of the vehicle when the light source is an ON state (i.e., "ON").

The objects of the present invention are not limited thereto, and the other objects of the present invention will be described in or be apparent from the following description of the embodiments.

According to an aspect of the present invention, there is provided a color light guide applying lamp for vehicle, comprising: a light source configured to irradiate a first color of light; and a light guide, at least one portion of which exhibits a second color, wherein after passing through the light guide, the first color of light exhibits a third color by mixing the first color and the second color.

According to another aspect of the present invention, there is provided a color light guide applying lamp for vehicle, comprising: a light source configured to irradiate white light; a light guide, at least one portion of which exhibits a first color other than white; and an external color layer which exhibits a second color other than white, wherein the white light sequentially passes through the light guide and the external color layer to exhibit a third color by mixing the first color and the second color.

According to the color light guide applying lamp for vehicle in accordance with exemplary embodiments of the present invention, it is possible to provide a distinctive lamp design when the lamp is in an OFF state by using a colored light guide, and satisfy the light distribution regulations of the vehicle by irradiating light of a required color by mixing light when the lamp is ON.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1:
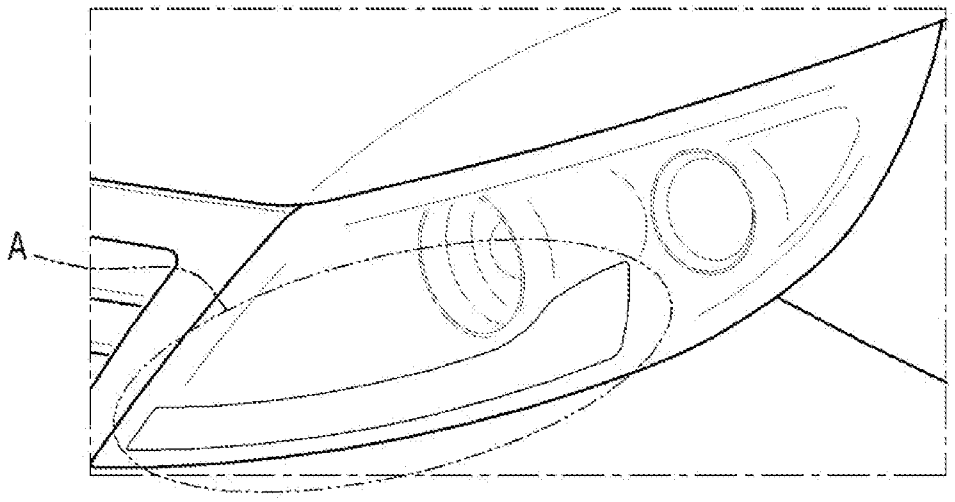
FIG. 1 PRIOR ART
FIG. 1 is a diagram showing the existing vehicle head lamp.
Figure 2:
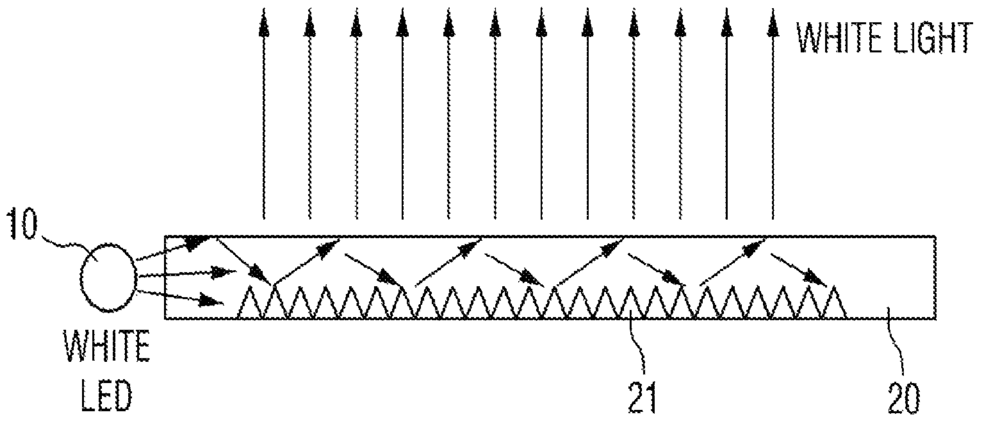
FIG. 2 is a schematic diagram illustrating a structure in which light is irradiated from portion A including a light guide of a head lamp of FIG. 1.

Hereinafter, embodiments of the present invention will be described in detail with reference to the accompanying drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals denote like elements throughout the specification.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 3:
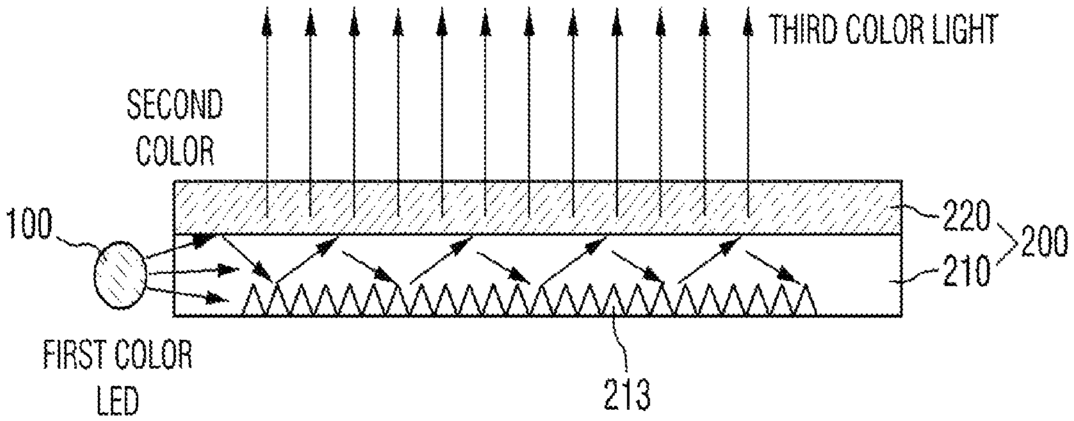
FIG. 3 is a schematic diagram for explaining a structure in which light is irradiated from a color light guide applying lamp for vehicle according to an exemplary embodiment of the present invention.

FIG. 3 is a schematic diagram for explaining a structure in which light is irradiated from a color light guide applying lamp for vehicle according to an exemplary embodiment of the present invention. First, referring to FIG. 3, a color light guide applying lamp for vehicle according to exemplary embodiments of the present invention includes a light source 100, and a light guide 200. The light source 100 irradiates a first color of light. Further, in the following description, the first color in FIG. 3 may be any possible color including white. On the other hand, a second color and a third color may be any possible color other than white.

Meanwhile, the following description will be made using an LED as an example of the light source. Further, a light emitting diode (LED) may be used typically as a light source of the vehicle lamp, but it is not necessarily limited thereto, and any kind of elements may be used as long as they can be used as a light source that emits light for illumination in the vehicle.

The light guide 200 may be characterized in that a portion of the light guide 200 has a second color. The light guide 200 may receive the first color of light irradiated from the light source 100 and allow the light to pass through a portion of the light guide 200 having the second color. Consequently, the light guide 200 emits light of a third color, which is obtained by mixing the first color and the second color.

A portion of the light guide 200 having the second color is also made of a transparent material that can transmit light, and a portion of the light guide 200 other than the portion having the second color is made of a colorless transparent material.

The light guide refers to an optical member which receives incident light from the light source and emits light by internal total reflection. If the light guide functions based on this principle, in other embodiments, in addition to the light guide, a lens may perform this function as well.

The light guide 200 may be further divided into a guide unit 210 and a light guide color layer 220. The guide unit 210 is made of a colorless transparent material, and receives the first color of light irradiated from the light source 100 as shown in FIG. 3. The first color of light propagates along a body of the guide unit 210, or is reflected by a mirror 213 having protrusions provided at the bottom of the guide unit 210 to pass through the upper side of the guide unit 210 on which the light guide color layer 220 is disposed. The light guide color layer 220 may be made of a transparent material having the second color. The first color of light that has passed through the guide unit 210 is mixed with the second color of the light guide color layer 220. As a result, light having the third color is emitted from the light guide color layer 220.

A configuration of the light guide 200 in which the guide unit 210 and the light guide color layer 220 are formed to overlap each other in the transmission direction of the light of the first color as shown in FIG. 3 can be achieved by double injection of color materials (blue, green, etc.) on a light emitting surface of the transparent light guide during the manufacture of the light guide 200.

Accordingly, when the light source 100 is ON, it is possible to irradiate a third color of light which is intended by the user and satisfies the light distribution regulations via light color mixing. Further, since the guide unit 210 is located on the inside of the vehicle lamp, and the light guide color layer 220 is located on the outside of the vehicle lamp, when the light source is OFF, the lamp exhibits the second color on the outside. Accordingly, it is possible to enable a distinctive colored lamp design unlike the conventional lamps.

Figure 4:
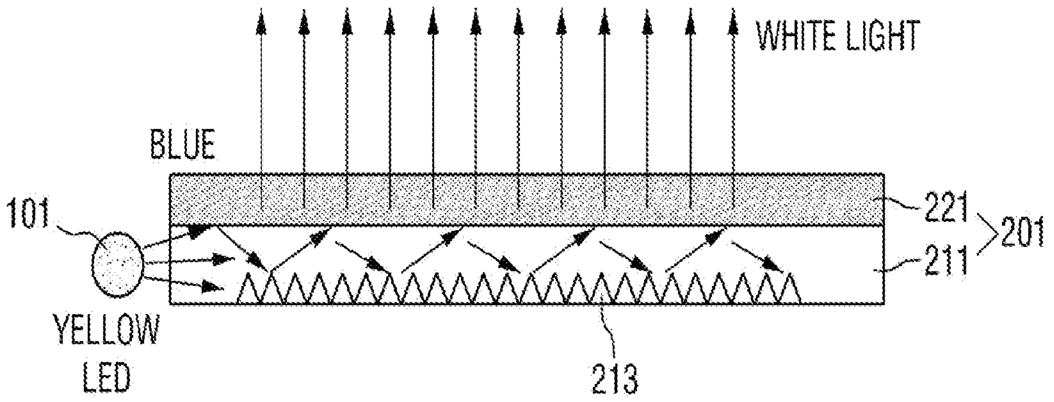
FIG. 4 is a schematic diagram showing an example in which white light is irradiated from a color light guide applying lamp for vehicle according to an exemplary embodiment of the present invention.
Figure 5:
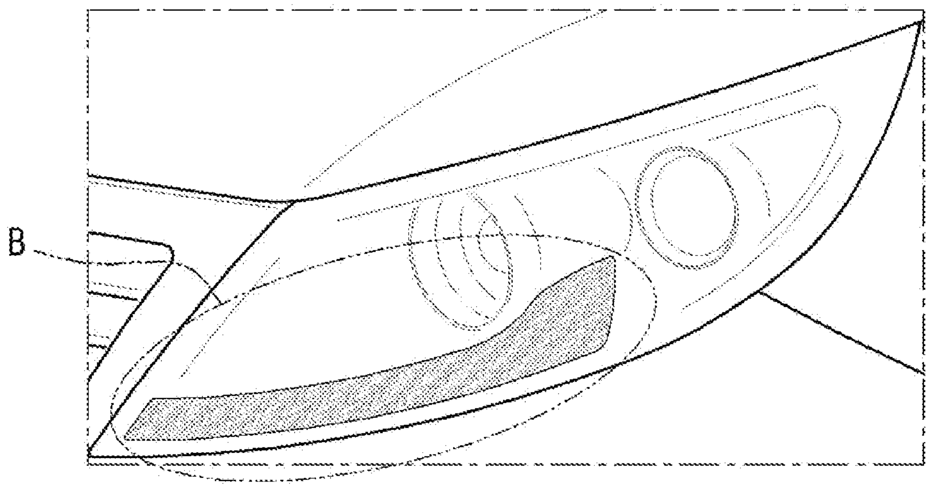
FIG. 5 illustrates an appearance of a vehicle head lamp in the case of using a color light guide applying lamp for vehicle shown in FIG. 4.

FIG. 4 is a schematic diagram showing an example in which white light is irradiated from a color light guide applying lamp for vehicle according to an embodiment of the present invention. FIG. 5 illustrates an appearance of a vehicle head lamp in the case of using a color light guide applying lamp for vehicle shown in FIG. 4. In FIG. 4, the first color which is a color of light irradiated from a light source 101 is yellow, and the second color which is a color of a light guide color layer 221 is blue. Yellow light is finally converted into white light by light color mixing while passing through the blue light guide color layer 221, and is irradiated out in front of the vehicle.

Further, the lamp which finally irradiates light of the third color may be a position lamp such as a sidelight. The position lamp irradiates light of the third color which is white. Accordingly, when the lamp is ON, it is possible to satisfy the light distribution regulations, and when the lamp is OFF, the lamp exhibits a second color, which is blue, as shown in FIG. 5. Therefore, it is possible to provide a distinctive lamp design compared to the conventional vehicle lamps as shown in FIG. 1.

Meanwhile, in an exemplary embodiment in which the light source 101 irradiates yellow light and the light guide color layer 221 exhibits a blue color has been illustrated in FIG. 4, but the present invention is not limited thereto. For example, in other embodiments, the light source 101 may irradiate blue light and the light guide color layer 221 may have a yellow color, thereby finally irradiating white light.

Figure 6:
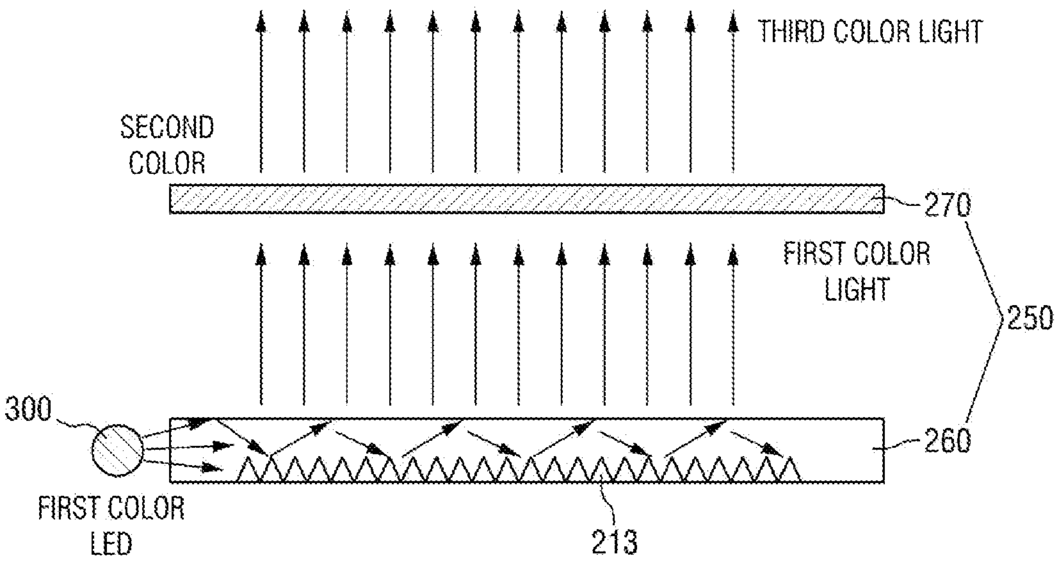
FIG. 6 is a schematic diagram for explaining a structure in which light is irradiated from a color light guide applying lamp for vehicle according to another exemplary embodiment of the present invention.

Meanwhile, FIG. 6 is a schematic diagram for explaining a structure in which light is irradiated from a color light guide applying lamp for vehicle according to another exemplary embodiment of the present invention. Unlike the structure of FIG. 3, in the structure shown in FIG. 6, a light guide color layer 270 is separated from a guide unit 260. An object of the color light guide applying lamp according to the exemplary embodiment of the present invention is to provide a vehicle lamp in which light having a color (first color) other than white is irradiated from a light source, and is allowed to pass through a layer having a different color (second color), thereby finally irradiating light having a desired color (third color). Thus, it can be considered that when the light guide color layer 270 and the guide unit 260 are separated from each other as shown in FIG. 6 as well as when the light guide color layer 220 and the guide unit 210 overlap each other to form the light guide 200 as shown in FIG. 3 falls in the scope of the present invention.

Figure 7:
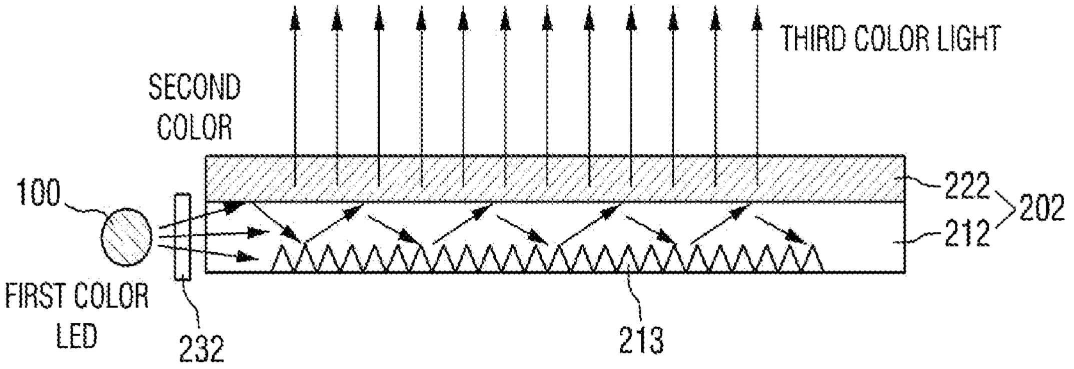
FIG. 7 is a schematic diagram for explaining a structure in which light is irradiated from a color light guide applying lamp for vehicle according to still another exemplary embodiment of the present invention.
Figure 8:
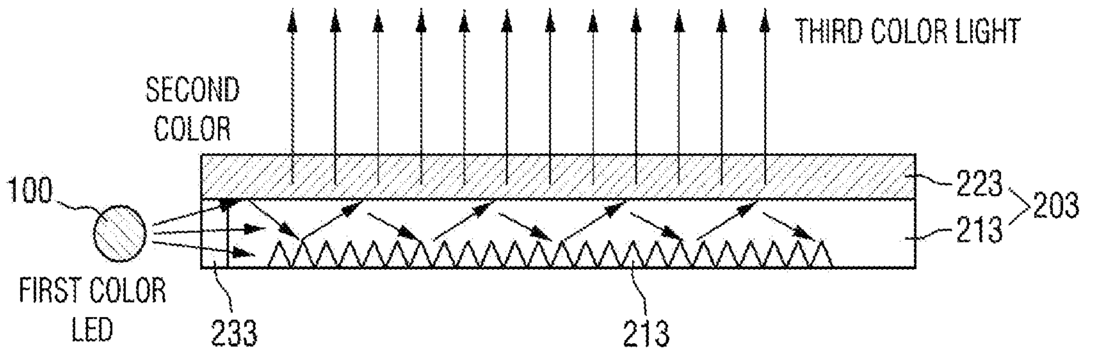
FIG. 8 is a schematic diagram for explaining a structure in which light is irradiated from a color light guide applying lamp for vehicle according to still another exemplary embodiment of the present invention.

FIGS. 7 and 8 are schematic diagrams for explaining a structure in which light is irradiated from a color light guide applying lamp for vehicle according to still another exemplary embodiment of the present invention. FIG. 7 illustrates an exemplary embodiment which further includes a filter 232 having a fourth color between the light source 100 and a light guide 202. In this case, at least one of the first color of the light source 100 and the fourth color of the filter 232 may be yellow. That is, the first color of the light source 100 may be white and the fourth color of the filter 232 may be yellow. Alternatively, both the first color of the light source 100 and the fourth color of the filter 232 may be yellow. In this case, when the second color of the light guide 202 is blue, it is possible to irradiate light of the third color that is white according to the embodiment of the color light guide applying lamp for vehicle.

FIG. 8 illustrates an exemplary embodiment which further includes an auxiliary light guide color layer 233 having a fourth color at a predetermined position of a guide unit 213. For convenience, the existing light guide color layer 223 is referred to as a first light guide color layer, and the auxiliary light guide color layer 233 is referred to as a second light guide color layer. Further, in this case, a predetermined position refers to a position of transmitting light irradiated from the light source 100 before the light of the light source 100 passes through at least the first light guide color layer 223. For example, the auxiliary light guide color layer 233 having the fourth color may be located as shown in FIG. 8. In this case, when the fourth color of the auxiliary light guide color layer 233 is yellow and the second color of the first light guide color layer 223 is blue. Similarly, it is possible to irradiate light of the third color that is white according to the exemplary embodiment of the color light guide applying lamp for vehicle.

Figure 9:
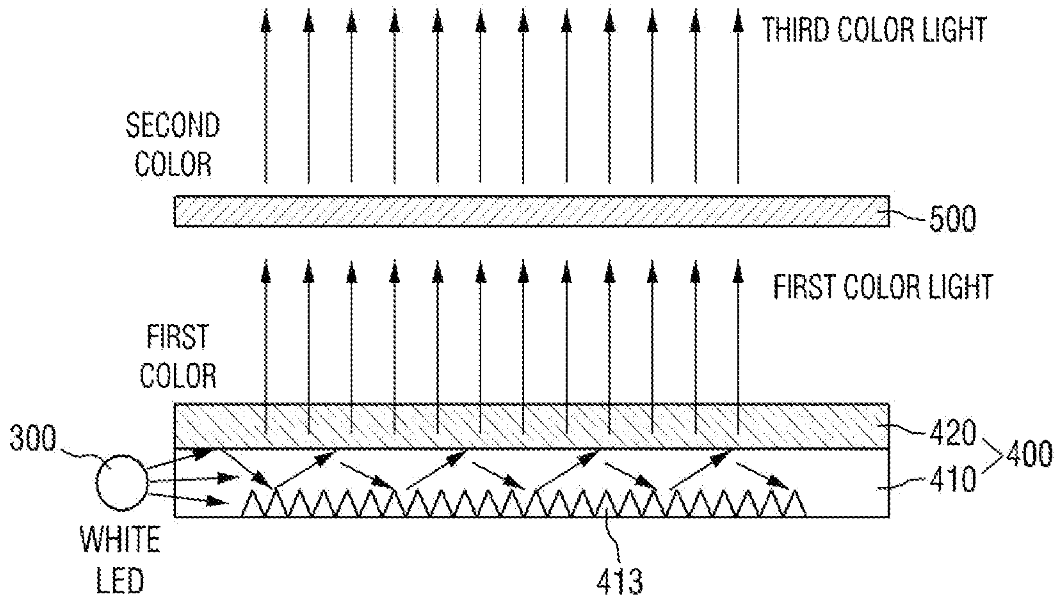
FIG. 9 is a schematic diagram for explaining a structure in which light is irradiated from a color light guide applying lamp for vehicle according to still another exemplary embodiment of the present invention.

FIG. 9 is a schematic diagram for explaining a structure in which light is irradiated from a color light guide applying lamp for vehicle according to still another embodiment of the present invention. Referring to FIG. 9, a color light guide applying lamp for vehicle according to still another embodiment of the present invention includes a light source 300, a light guide 400, and an external color layer 500. Preferably, the light source 300 irradiates white light.

The light guide 400 is characterized in that a portion of the light guide 400 has the first color. The light guide 400 receives white light irradiated from the light source 300 and allows the light to pass through a portion of the light guide 400 having the first color. Consequently, white light is converted into light of the first color while passing through the light guide 400.

A portion of the light guide 400 having the first color may also be made of a transparent material that can transmit light, and a portion of the light guide 400 other than the portion having the first color is made of a colorless transparent material. The light guide 400 may be further divided into a guide unit 410 and a light guide color layer 420. The guide unit 410 is made of a colorless transparent material, and receives light of the first color irradiated from the light source 300 as shown in FIG. 7. The white light propagates along a body of the guide unit 410, or is reflected by a reflection mirror 413 having protrusions provided at the bottom of the guide unit 410 to pass through the upper side of the guide unit 410 on which the light guide color layer 420 is disposed.

The light guide color layer 420 is made of a transparent material having the first color. The white light that has passed through the guide unit 410 passes through the light guide color layer 420 having the first color. Accordingly, by the influence of the first color of the light guide color layer 420, light having the first color is emitted from the light guide color layer 420.

A configuration of the light guide 400 in which the guide unit 410 and the light guide color layer 420 are formed to overlap each other in the transmission direction of the white light as shown in FIG. 9 can be achieved by double injection of color materials (blue, green, etc.) on a light emitting surface of the transparent light guide in the manufacture of the light guide 400.

The first color of light that has passed through the light guide 400 subsequently passes through the external color layer 500. The external color layer 500 exhibits the second color, and the first color of light that has passed through the light guide passes through the external color layer 500 having the second color. Then, finally, the light having passed the external color layer 500 is converted into light having the third color obtained by light color mixing. The external color layer 500 may be embodied as an outer lens of the lamp. Accordingly, when the light source 300 is ON, it is possible to irradiate light of the third color which is intended by the user and satisfies the light distribution regulations by light color mixing.

Further, in the embodiment shown in FIG. 9, the guide unit 410, the light guide color layer 420 and the external color layer 500 are sequentially located from the inside to the outside of the color light guide applying lamp for vehicle according to the exemplary embodiment illustrated in FIG. 7. Accordingly, when the light source is OFF, the lamp emits the second color. Accordingly, it is possible to offer a distinctive colored lamp design having a color unlike the existing lamp.

Figure 10:
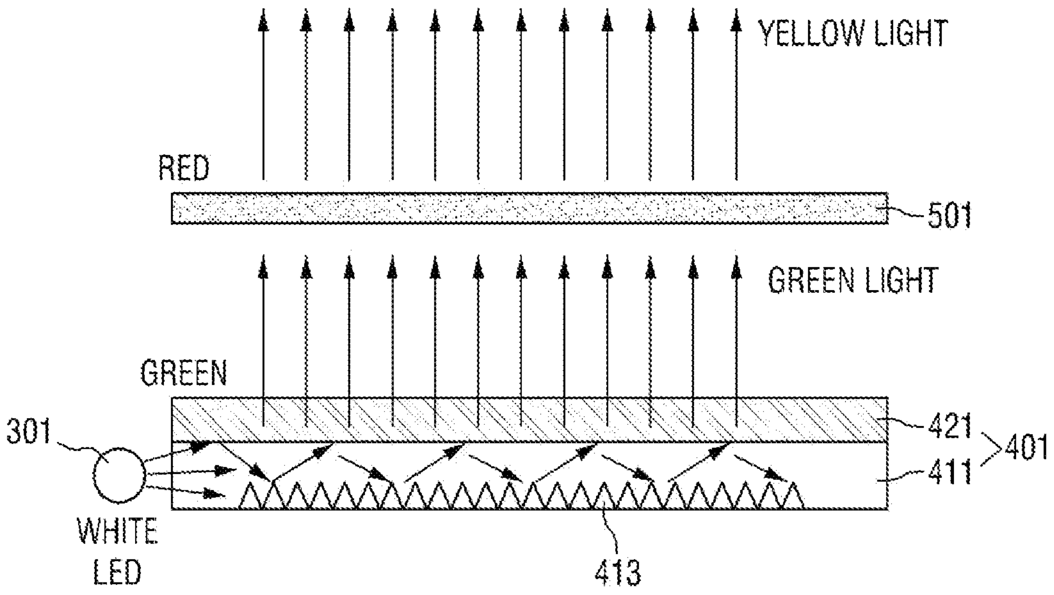
FIG. 10 is a schematic diagram showing an example in which yellow light is irradiated from a color light guide applying lamp for vehicle according to still another exemplary embodiment of the present invention.
Figure 11:
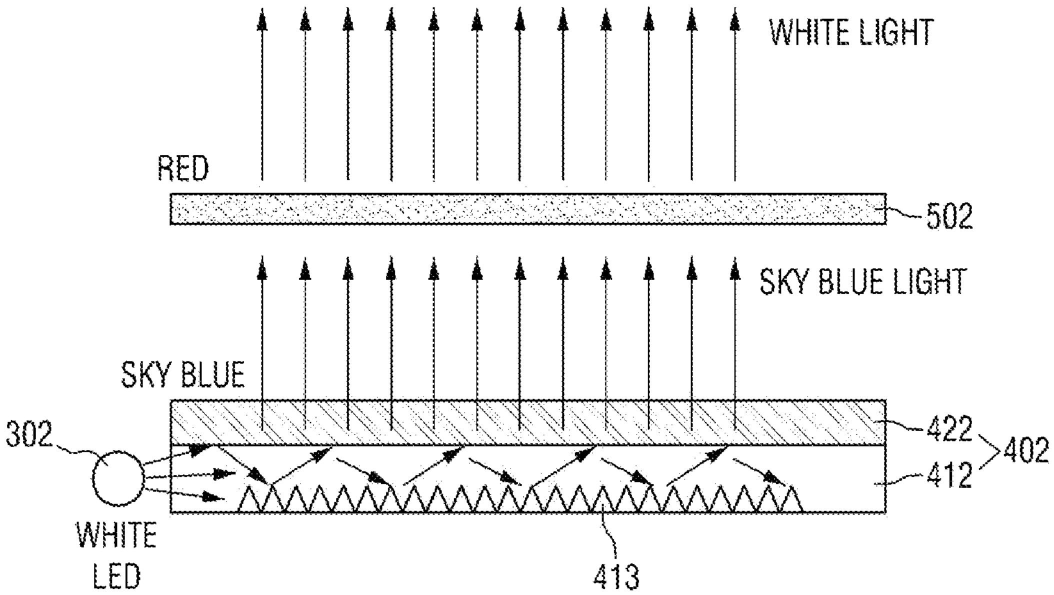
FIG. 11 is a schematic diagram showing an example in which white light is irradiated from a color light guide applying lamp for vehicle according to still another exemplary embodiment of the present invention.

FIG. 10 is a schematic diagram showing an example in which yellow light is irradiated from a color light guide applying lamp for vehicle according to still another exemplary embodiment of the present invention. FIG. 11 is a schematic diagram showing an example in which white light is irradiated from a color light guide applying lamp for vehicle according to still another exemplary embodiment of the present invention.

In FIG. 10, white light irradiated from a light source 301 passes through a colorless transparent guide unit 411, and is converted into green light after passing through a light guide color layer 421 having the first color that is green. Then, the green light is finally converted into yellow light having the third color by light color mixing while passing through an external color layer 501 having the second color that is red, and is irradiated to the outside of the lamp. Further, the lamp which finally irradiates yellow light of the third color may be a turn signal lamp such as an indicator. The turn signal lamp may irradiate the third color of light which is yellow. Accordingly, when the lamp is ON, it is possible to satisfy the light distribution regulations, and when the lamp is OFF, the lamp exhibits the second color, which is red. Therefore, it is possible to provide a distinctive lamp design.

Meanwhile, the exemplary embodiment in which the light guide color layer 421 is green and the external color layer 501 is red has been illustrated in FIG. 10. However, on the contrary, it is also possible to implement an embodiment in which the light guide color layer 421 exhibits a red color, and the external color layer 501 exhibits a green color, thereby finally irradiating yellow light.

Then, in FIG. 11, white light irradiated from a light source 302 passes through a colorless transparent guide unit 412, and is converted into, for example, sky blue light after passing through a light guide color layer 422 having the first color that is sky blue. Then, the sky blue light is finally converted into white light having the third color by light color mixing while passing through an external color layer 502 having the second color that is red, and is irradiated to the outside of the lamp.

In this way, the lamp which finally irradiates white light as the third color may be a backup lamp such as a tail light. The backup lamp, accordingly, may irradiate light as the third color which is white. Accordingly, when the lamp is ON, it is possible to meet the light distribution regulations, and when the lamp is OFF the lamp exhibits the second color, which is red. Therefore, it is possible to provide a distinctive lamp design.

Meanwhile, the embodiment in which the light guide color layer 422 is sky blue and the external color layer 502 is red has been illustrated in FIG. 11. However, on the contrary, it is also possible to implement an exemplary embodiment in which the light guide color layer 422 exhibits a red color, and the external color layer 502 exhibits a sky blue color, thereby finally irradiating white light.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A color light guide applying lamp for vehicle, comprising:

a light source configured to irradiate a first color of light;

a light guide, at least one portion of which exhibits a second color;

a reflecting part having a plurality of protrusions formed along an opposite side of the light guide from which light is reflected; and a filter having a fourth color spaced apart from the light source and disposed between the light source and the light guide, wherein after passing through the light guide, the first color of light exhibits a third color of light by passing the first color of light through the second color, wherein the light guide includes a colorless guide unit formed from a colorless transparent material which transmits a light having passed through the filter, and a light guide color layer which exhibits the second color and receives the light having passed through the guide unit and emits the third color, wherein the colorless guide unit and the light guide color layer are integrally and optically bonded and have a surface contact therebetween, and wherein the color light guide applying lamp is disposed within a casing of a headlamp at a front side of the vehicle.

2. The color light guide applying lamp for vehicle of claim 1, wherein the guide unit and the light guide color layer are formed to overlap each other in a transmission direction of the first color of light passing through the light guide color layer.

3. The color light guide applying lamp for vehicle of claim 1, wherein the guide unit is located on an inside of the lamp, the light guide color layer is located on an outside of the lamp, and the lamp exhibits the second color on the outside when the light source is off.

4. The color light guide applying lamp for vehicle of claim 1, wherein the guide unit and the light guide color layer are formed integrally by double injection.

5. The color light guide applying lamp for vehicle of claim 1, wherein one of the first color and the second color is yellow and the other one is blue.

6. The color light guide applying lamp for vehicle of claim 1, wherein the third color is white and the lamp is a position lamp.

7. The color light guide applying lamp for vehicle of claim 1, wherein the first color and the second color are complementary to each other.

8. The color light guide applying lamp for vehicle of claim 1, wherein at least one of the first color and the fourth color is yellow.

9. The color light guide applying lamp for vehicle of claim 1, wherein the light guide color layer is a first light guide color layer, and the light guide further includes a second light guide color layer having a fourth color at a predetermined position of the guide unit on which light from the light source is incident.

10. The color light guide applying lamp for vehicle of claim 9, wherein the fourth color is yellow, and the guide unit, the first light guide color layer and the second light guide color layer are formed integrally by double injection.

11. A color light guide applying lamp for vehicle, comprising:

a light source configured to irradiate white light;

a light guide, at least one portion of which exhibits a first color other than white;

an external color layer which exhibits a second color other than white;

a reflecting part having a plurality of protrusions formed along an opposite side of the light guide from which light is reflected; and a filter having a fourth color spaced apart from the light source and disposed between the light source and the light guide, wherein the white light sequentially passes through the light guide and the external color layer to exhibit a third color by passing the first color through the second color, wherein the light guide includes a colorless guide unit formed from a colorless transparent material which transmits a light having passed through the filter; and a light guide color layer which exhibits the first color and receives the light having passed through the guide unit, wherein the colorless guide unit and the light guide color layer are integrally and optically bonded and have a surface contact therebetween, and wherein the external color layer is a casing of a lamp for the vehicle.

12. The color light guide applying lamp for vehicle of claim 11, wherein the guide unit and the light guide color layer are formed to overlap each other in a transmission direction of the white light passing through the light guide color layer.

13. The color light guide applying lamp for vehicle of claim 11, wherein one of the first color and the second color is green and the other one is red.

14. The color light guide applying lamp for vehicle of claim 11, wherein the third color is yellow and the lamp is a turn signal lamp.

15. The color light guide applying lamp for vehicle of claim 11, wherein one of the first color and the second color is red and the other one is sky blue.

16. The color light guide applying lamp for vehicle of claim 11, wherein the third color is white and the lamp is a backup lamp.

17. The color light guide applying lamp for vehicle of claim 11, wherein the guide unit and the light guide color layer are formed integrally by double injection.

18. The color light guide applying lamp for vehicle of claim 11, wherein the first color and the second color are complementary to each other.

19. The color light guide applying lamp for vehicle of claim 1, wherein the casing of the headlamp further comprises a front window having a transparent first section and a second section having the guide unit and the light guide color layer disposed therein.

20. The color light guide applying lamp for vehicle of claim 1, wherein the filter is positioned adjacent to the light guide.

21. The color light guide applying lamp for vehicle of claim 1, wherein the filter is positioned beneath the light guide color layer and adjacent to the reflecting part.

* * * * *